United States Patent Office 3,644,486
Patented Feb. 22, 1972

3,644,486
PROCESS FOR THE MANUFACTURE OF OXACYLATION PRODUCTS AND OPTIONALLY HYDROXYLATION PRODUCTS OF CONDENSED AROMATIC COMPOUNDS
Manfred Boldt and Hans-Jurgen Arpe, Fischbach, Taunus, and Lothar Hornig, Frankfurt am Main, Germany, assignors to Farbwerke Hoechst Aktiengesellschaft vormals Meister Lucius & Bruning, Frankfurt am Main, Germany
No Drawing. Filed Sept. 19, 1968, Ser. No. 760,964
Claims priority, application Germany, Sept. 23, 1967, F 53,564
Int. Cl. C07c 69/14, 69/24, 69/62
U.S. Cl. 260—479 R                           6 Claims

ABSTRACT OF THE DISCLOSURE

Catalytic manufacture of oxacylation products and optionally hydroxylation products of condensed aromatic cmpounds from condensed aromatic compounds and saturated aliphatic or cycloaliphatic carboxylic acids and molecular oxygen in the presence of a noble metal of sub-group 8 of the Mendeleeff Periodic Table or compounds thereof, the stable valency of this noble metal in said compounds being at most 4.

---

The present invention relates to a process for the manufacture of oxacylation products and optionally hydroxylation products of condensed aromatic compounds.

It has already been proposed to make acetic acid phenyl ester from benzene and acetic acid in the liquid as well as in the gaseous phase in the presence of oxygen and a noble metal of sub-group 8 of the Mendeleeff Periodic Table, the stable valency of which in its compounds is at most 4, preferably palladium.

The present invention provides a process for the manufacture of oxacylation products and optionally hydroxylation products of condensed aromatic compounds, which comprises reacting a condensed aromatic compound with a saturated aliphatic or cycloaliphatic carboxylic acid and molecular oxygen in the presence of a noble metal of sub-group 8 of the Mendeleeff Periodic Table or compounds thereof, the stable valency of this noble metal in said compounds being at most 4.

As condensed aromatic hydrocarbons it is advantageous to use those containing 2 or 3 aromatic rings condensed with one another, for example, anthracene, phenanthrene, fluorene, and preferably naphthalene. The hydrocarbons may also contain one or more halogen atoms X or ether groups —OR as substituents, X being advantageously fluorine, chlorine or bromine and R being an alkyl or cycloalkyl group with 1 to 10 carbon atoms. Examples of such compounds are: α- and β-chloronaphthalene, α- and β-bromonaphthalene, pentachloronaphthalene, dichloroanthracene, β-naphthylmethyl ether (nerolin), β-naphthyl-9,10-ethyl ether, 1-methoxyphenanthrene and 2-methoxy fluorene. The substituted aromatic compounds must contain at least one unsubstituted aromatic hydrocarbon atom.

As carboxylic acids there may be used saturated aliphatic or cycloaliphatic monocarboxylic acids, advantageously those containing up to 8 carbon atoms, or the mixtures thereof, for example, propionic acid, butyric acid, isobutyric acid, and preferably acetic acid. The carboxylic acids are advantageously used in as concentrated a form as possible, for example, acetic acid in the form of glacial acetic acid. Small contents of water of up to about 10% of the carboxylic acids used are tolerable, however. It is also possible to use mixtures of the carboxylic acids with the corresponding anhydrides in amounts of, for example, up to 30%.

The oxygen may be introduced in an elementary form or in the form of air.

As noble metals the elements rhodium, iridium, platinum, ruthenium and advantageously palladium may be used in a finely divided form. As noble metal compounds there may be used salts of the noble metals with inorganic acids or advantageously with aliphatic saturated carboxylic acids or complex compounds thereof with unsaturated or aromatic compounds. Examples of suitable noble metal compounds are palladium chloride, palladium sulfate, palladium acetate, the complex of benzene and palladium acetate, and compounds of alkali metal acylates with palladium acetate. It is also possible to use noble metal oxides, for example palladium oxide.

The reaction may be carried out in liquid or in the gaseous or vapour phase. High-boiling substances, for example those having a boiling point of above 150° C., are advantageously reacted in the liquid or trickling phase. As reaction liquid for the liquid or trickling phase the aliphatic carboxylic acid used as starting substance or a mixture of the reaction components may be used.

The noble metals or the compounds thereof are used in the liquid phase in a finely divided, dispersed or dissolved form. In the gaseous phase they are advantageously used in a finely divided form supported on a carrier, for example, aluminium oxide, aluminium silicate, silica gel, carbon, zeolites, pumice, clays, feldspars or molecular sieves.

The concentration of the noble metals or the compounds thereof may vary within wide limits and may be, for example, within the range of from 0.1 to 10% by weight calculated on the total liquid or the system of carrier and catalyst when the process is carried out in the gaseous phase.

In addition to the noble metals, transition metals, for example, gold, copper, silver, iron and manganese, or elements of Group 5 or 6 of the Mendeleeff Periodic Table, for example, antimony, bismuth, selenium and tellurium, may advantageously be added as promoters. These elements may be used in concentrations of up to 50 atom percent, preferably up to about 30 atom percent, calculated on the noble metal. By the addition of the promoters, the yields of oxacylation products are increased.

The activity of the catalyst may be additionally increased by adding activators. As activators there may be used, for example, salts of a strong base with a weak acid, for example, carbonates or acylates of alkali or alkaline earth metals. There may also be used salts which form a buffer system with the carboxylic acid used in a given case, for example, sodium phosphates or borax. There are preferably used the alkali metal salts of the carboxylic acid used, for example, the alkali metal acetates, which are advantageously added to the reaction solution in amounts within the range of from 0.1 to 10% by weight or which may also be supported on the carrier. There may furthermore be used neutral or basic carboxylates of the metals of Group 2b, 3 or 4 of the Mendeleeff Periodic Table, having an atomic number of at most 72, for example acylates of zinc, cadmium or of rare earths.

During the reaction the concentration of the activator in the catalyst should remain constant. Losses which may be caused by a volatility of the compounds in the course of the reaction are advantageously compensated by adding the activators, for example, to the reaction components.

The reaction conditions used may vary within wide limits. The reaction temperatures are advantageously within the range of from 50 to 300° C., preferably from 50° C. to the boiling temperature of the reaction mixture under the pressure used, and in the gaseous phase above the boiling point of the reactants. The pressure is advantageously within the range of from 1 to 30, preferably 1 to 15, atmospheres absolute.

The mixing ratios of the individual reactants may also vary within wide limits. The carboxylic acid is advantageously used in an excess amount, preferably an amount 4 times in excess, to improve the yields of oxacylation products. It is also possible, however, to use the condensed aromatic compound in an amount up to 4 times in excess. Any amounts of unreacted starting materials are advantageously recycled.

By the reaction, the oxacylation products of the condensed aromatic compounds used are obtained either alone or in admixture with unesterified hydroxylation products, the oxacyl and hydroxyl groups being directly bound to the nucleus. Naphthalene yields, for example, 1-naphthyl acetate. The mixing ratio of the resulting products and the position of the newly introduced oxacyl or hydroxyl group in the aromatic nucleus vary with the reaction conditions.

The reaction mixture is worked up by known methods; the esters may be used as such or they may be split into hydroxy derivative and carboxylic acid.

The process in accordance with the invention enables hydroxyl groups to be introduced directly into condensed aromatic ring systems which can otherwise be hydroxylated only in a complicated manner under difficult conditions.

The following examples serve to illustrate the invention, but are not intended to limit it.

EXAMPLE 1

32 g. (0.25 mole) naphthalene, 75 g. (1.25 moles) acetic acid, 2.65 g. (0.025 g.-atom) palladium (precipitated from palladium chloride with an alkaline hydrazine hydrate solution and reduced) and 4.9 g. (0.05 mole) potassium acetate were heated for 56 hours at 100° C. while stirring and introducing 2.2 l. (0.1 mole) oxygen per hour. The work up of the reaction mixture yielded 0.98 g. 1-naphthyl acetate.

EXAMPLE 2

117 g. (0.74 mole) nerolin (β-naphthylmethyl ether), 320 g. (5.33 moles) acetic acid and 38.24 g. (0.39 mole) potassium acetate were heated for 6.5 hours at 118° C. in a flask provided with stirring means in a manner analogous to Example 1, in the presence of a catalyst obtained by the impregnation of 40 g. silica gel with a nitric acid solution of 9.14 g. palladium acetate and 197 g. bismuth nitrate and subsequent reduction at 220° C. with methanol vapours. The work-up of the reaction mixture yielded 14.3 g. 1-acetoxy-2-methoxy-naphthalene.

What is claimed is:

1. A process for the manufacture of oxacylation products and hydroxylation products of condensed aromatic hydrocarbons or substituted condensed aromatic hydrocarbons, which comprises reacting said condensed aromatic hydrocarbons with a saturated aliphatic carboxylic acid and molecular oxygen in liquid phase at temperatures within the range from 50 to 300° C. and under pressures within the range from 1 to 30 atmospheres absolute in the presence of a noble metal or a compound of a noble metal wherein said noble metal is selected from the group consisting of ruthenium, rhodium, palladium, iridium and platinum.

2. The process of claim 1, wherein there is additionally used, as promotor, a metal of Group V of the Mendeleeff Periodic Table.

3. The process of claim 1 wherein the saturated aliphatic carboxylic acid has up to 4 carbon atoms.

4. The process of claim 1 wherein the noble metal is palladium or a palladium compound.

5. The process of claim 1 wherein the condensed aromatic compound is naphthalene.

6. The process of claim 1 wherein the saturated aliphatic carboxylic acid is acetic acid.

References Cited

UNITED STATES PATENTS 3,190,912  6/1965  Robinson _____ 260—497
3,221,045  11/1965  McKeon et al. _____ 260—497

FOREIGN PATENTS 1,407,526  6/1965  France _____ 260—497

OTHER REFERENCES

Davidson et al.: Chem. & Ind. (March 1966), p. 457.

JAMES A. PATTEN, Primary Examiner

U.S. Cl. X.R.

252—430, 431 C, 439, 462, 470, 471, 472, 473, 474; 260—408, 410.5, 468 R